(12) United States Patent
Fahim

(10) Patent No.: US 6,952,398 B1
(45) Date of Patent: Oct. 4, 2005

(54) SYSTEM AND METHOD FOR OPTIMAL ALLOCATION OF LINK BANDWIDTH IN A COMMUNICATIONS NETWORK FOR TRUCK ROUTING

(76) Inventor: Furrukh Fahim, 4313 Risinghill Dr., Plano, TX (US) 75024

( * ) Notice: Subject to any disclaimer, the term of this patent is extended or adjusted under 35 U.S.C. 154(b) by 0 days.

(21) Appl. No.: 09/558,962

(22) Filed: Apr. 25, 2000

Related U.S. Application Data

(60) Provisional application No. 60/131,731, filed on Apr. 30, 1999.

(51) Int. Cl.[7] .............................................. G01R 31/08
(52) U.S. Cl. ...................................... 370/229; 370/248
(58) Field of Search ................................. 370/228, 230, 370/235, 237, 238, 238.1, 248, 252, 255, 352, 351, 230.1; 709/104, 226, 229; 703/13, 21

(56) References Cited

U.S. PATENT DOCUMENTS 5,452,294 A * 9/1995 Natarajan ..................... 370/54
6,349,090 B1 * 2/2002 Lewis et al. ................. 370/238
6,442,615 B1 * 8/2002 Nordenstam et al. ....... 709/241
6,724,722 B1 * 4/2004 Wang et al. ................. 370/229

* cited by examiner

*Primary Examiner*—Wellington Chin
*Assistant Examiner*—Brenda Pham
(74) *Attorney, Agent, or Firm*—Ruben C. DeLeon; Winstead Sechrest & Minick P.C.

(57) ABSTRACT

A system and method for routing the maximum number of trunks on a network with resource constraints is described. The invention provides a unique modification of a multi-commodity mathematical model that maximizes flow in a capacity constrained network. The problem of routing the maximum number of trunks through a communications network can be described as a multi-commodity problem by mapping each trunk as a commodity. However, in the multi-commodity model, the resources or capacity used by a unit of any commodity is the same. This condition is too restrictive for contemporary multi-rate broadband networks because a high bandwidth traffic trunk consumes more bandwidth than a trunk with low bandwidth requirement. The invention provides a method to modify the multi-commodity model so that the capacity utilized by different trunks does not have to be identical.

14 Claims, 4 Drawing Sheets

90
INITIALIZE
1. CREATE A DIRECTED GRAPH OF THE COMMUNICATIONS NETWORK
2. CREATE A LIST OF COMMODITIES FROM THE LIST OF TRAFFIC TRUNKS. FOR EACH SET INGRESS AND EGRESS TO DEMAND AND SUPPLY NODES IN THE DIRECTED GRAPH SET THE FLOW UNITS OF THE DEMAND-SUPPLY PAIR = NUMBER OF TRUNKS BETWEEN THE INGRESS-EGRESS PAIR
3. LET K = NUMBER OF COMMODITIES
4. SET commodityID = 1

92 IF commodityID <= K ? — NO → STOP 94

YES

96 SET ARC CAPACITY
1. SET $\mu$ = BANDWIDTH OF THE TRAFFIC PAIR IDENTIFIED BY commodityID
2. FOR EACH LINK $l$
   SET $\beta$ = TOTAL BANDWIDTH OF $l$
   SET $\lambda$ = LOAD ON LINK $l$
   SET $c = \lfloor (\beta-\lambda)/\mu \rfloor$
   SET THE CAPACITY OF THE ARC(S) REPRESENTING $l$ EQUAL TO $c$

98 USE NETWORK SIMPLEX ALGORITHM TO SOLVE THE MAXIMUM FLOW PROBLEM FOR THE COMMODITY

100 UPDATE LINK LOAD
1. SET $\mu$ = BANDWIDTH OF THE TRAFFIC PAIR
2. FOR EACH LINK $l$
   SET $f$ = TOTAL FLOW ON THE ARCS REPRESENTING $l$
   SET $\lambda$ = LOAD ON LINK $l$
   SET LOAD ON 1 = $(\mu f + \lambda)$

102 MAP THE ROUTES TAKEN BY THE COMMODITY IN THE DIGRAPH ON THE TRAFFIC TRUNK OVER THE COMMUNICATION NETWORK

104 commodityID = commodityID + 1

*Fig. 6*

SYSTEM AND METHOD FOR OPTIMAL ALLOCATION OF LINK BANDWIDTH IN A COMMUNICATIONS NETWORK FOR TRUCK ROUTING

CROSS-REFERENCE TO RELATED APPLICATION

This application relates to, and claims priority of, provisional application Ser. No. 60/131,731 filed Apr. 30, 1999.

FIELD OF THE INVENTION

The present invention relates to routing multirate traffic streams through a communications network and more particularly for a method and a system to allocate bandwidth resources on network links to increase the number of traffic streams that are routed over the network.

BACKGROUND OF THE INVENTION

Devices such as computer terminals, phones, fax machines, etc. can transfer information such as data, voice, video, and electronic mail, etc. by means of communication networks. When devices communicate, they generate traffic that is routed over the communication network to which the devices are connected.

In a connection-oriented data network, a call setup phase establishes the route between the call origination and destination points in the network. All traffic is sent through the network on the path established in the call setup phase. During the call setup phase, bandwidth resources are reserved to route a traffic stream through the network. An important feature of contemporary connection-oriented networks, e.g. frame relay, ATM, and MPLS, is the ability to deliver services with varying rates. The traffic streams to deliver different service types, e.g. voice or video, require different amount of resources across the network. If a route cannot be found with the required amount of bandwidth then the call is blocked from accessing the network.

A network is composed of nodes (switches) and links. A link connects exactly two nodes. The traffic that enters a network is usually referred to as an ingress node and the traffic that leaves the network is usually referred to as an egress node. Hereafter, ingress and egress nodes will be referred to simply as ingress and egress. In state-of-the-art broadband data networks, either constant or variable bit rate characterizes a traffic stream. The bandwidth resources required to service a constant bit rate are straightforward. However, the bandwidth needed to service a variable bit rate traffic stream can be determined using the concept of Equivalent or Effective bandwidth. Numerous techniques have been developed to determine effective bandwidth of a variable bit rate, see for example M. Schwartz, "Broadband Integrated Networks", Prentice Hall, 1996, and R. Guerin, H. Ahmadi, and M. Naghshineh, "Equivalent Capacity and Its Application to Bandwidth Allocation in High-Speed Networks", IEEE Journal on Selected Areas in Communications, Vol. 9, No. 7, 1991. Although the traffic in a data network is routed in discrete packets or frames or cells, due to the effective bandwidth concept the traffic flow can be treated as constant. Therefore, in the context of routing, a Time Division Multiplex (TDM) trunk is similar to a virtual connection in Asynchronous Transmission Mode (ATM) or a virtual circuit in frame relay or a label switch path (LSP) in Multi-Protocol Label Switching (MPLS). Hereafter, trunk will be used to refer to a virtual connection or virtual circuit or LSP.

One method addresses optimal routing but uses a technique of asymptotically determining loss probability then solves a set of linear equations to determine network sensitivity. Another system provides a method of grouping virtual circuits into virtual paths. Traffic trues consume bandwidth resources on the network links and nodes. To insure acceptable quality of service (QoS) trunks should be routed so that resources are not over-utilized. When their traffic is loaded on trunks that are routed on over-utilized links, the customers experience performance problems such as long delays and loss of data. Hence it is critically important to route trunks such a way that same bandwidth resources are not allocated to different trunks that will cause congestion in the network.

The number of trunks that can be routed over a given network greatly depends on how network resources are allocated to various trunks. Therefore, the problem of routing maximum number of trunks in a resource-constrained network can essentially be characterized as an optimal resource allocation problem. The combinatorial nature of the optimal routing requires efficient search algorithms.

Therefore, what is needed is a method and system to optimally allocate link bandwidth in a communications network.

SUMMARY OF THE INVENTION

In contrast to the prior art, the present invention provides a method for optimal allocation of link bandwidth in a communications network for trunk routing.

To this end, in one embodiment the method includes mapping the network routing problem on a unique modification of a well proven mathematical model. Furthermore, the invention describes an efficient search algorithm that searches for routing solutions to increase the number of trunks routed over the network without violating resource constraints.

One objective of the invention is to generate a maximum number of routes for trunks by allocating network resources on these routes. Such routes can be used to develop routing tables or route configuration commands for switches that may use pre-determined routes to route traffic through the network. Since the invention allocates specific resources to the traffic trunks along the entire route, it allows network engineers to plan and engineer trunks that require Quality of Service (QoS).

As part of a routing system, the invention helps network engineers allocate resources to a maximize number of trunks that are routed upon the network without over-utilization of resources. The invention includes a mathematical model and a routing algorithm that operates on a resource constrained network.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 6 illustrates a flow chart of the process.

DETAILED DESCRIPTION OF THE PREFERRED EMBODIMENTS

The present invention can be describe with several examples given below. It is understood, however, that the examples below are not necessarily limitations to the present invention, but are used to describe typical embodiments of operation.

As stated earlier, one objective of the invention is to route maximum number of trunks on a network with resource constraints. The invention provides a unique modification of a multi-commodity mathematical model that maximizes flow in a capacity constrained network. The problem of routing maximum number of trunks through a communications network can be described as a multi-commodity problem by mapping each trunk as a commodity. However, in the multi-commodity model, the resources or capacity used by a unit of any commodity is the same. This condition is too restrictive for contemporary multi-rate broadband networks because a high bandwidth traffic trunk consumes more bandwidth than a trunk with low bandwidth requirement. The invention provides a method to modify the multi-commodity model so that the capacity utilized by different trunks does not have to be identical.

In sum, the problem can be rephrased as although realistic networks have to route competing traffic demands, the networks have limited resources to do so. The number of traffic trunks that can be routed over a given network of limited resources is dependent heavily on the routes of the trunk.

Figure 1:
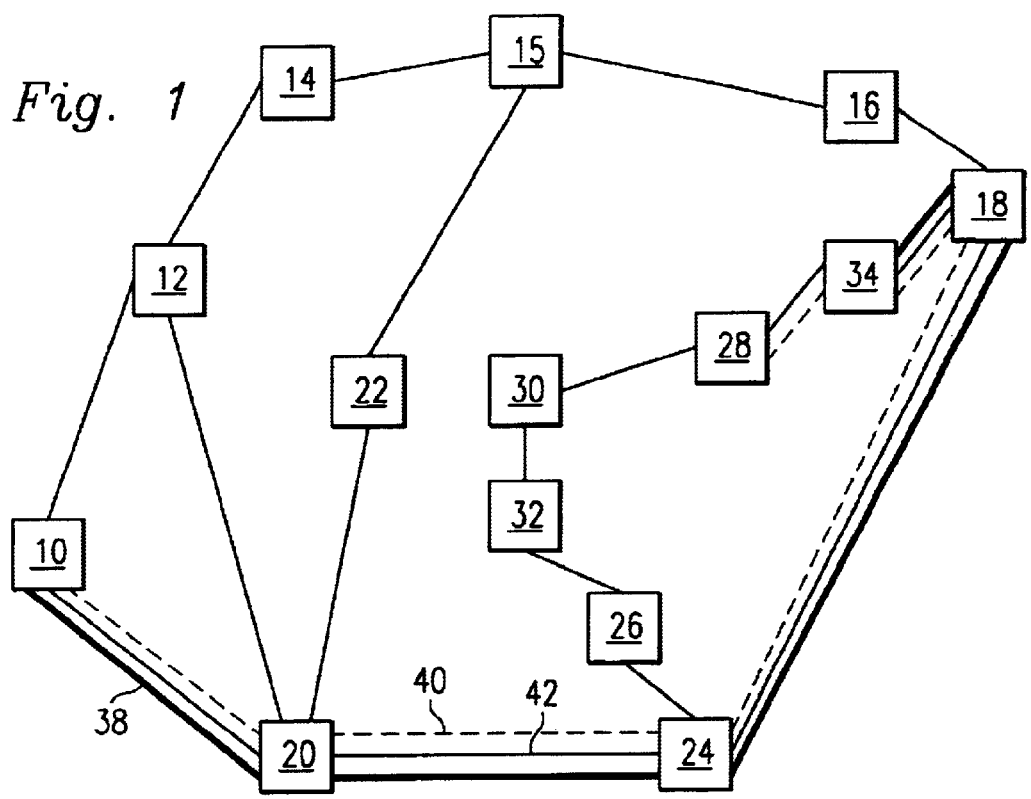
FIG. 1 is a diagram of the shortest paths for two trunks.

To illustrate the combinatorial nature of routing problems, consider the example of a network presented in FIG. 1. Suppose there is one unit of capacity available on each link 42 (one unit of bandwidth capacity could be a DS1 or DS3 or any other signaling rate in a communications network). Also suppose the two traffic trunks, the shortest path 38 from network element 10 to network element 28 requires 1 unit of capacity, and the shortest path 40 from network element 10 to network element 34 requires 1 unit of capacity.

Figure 2:
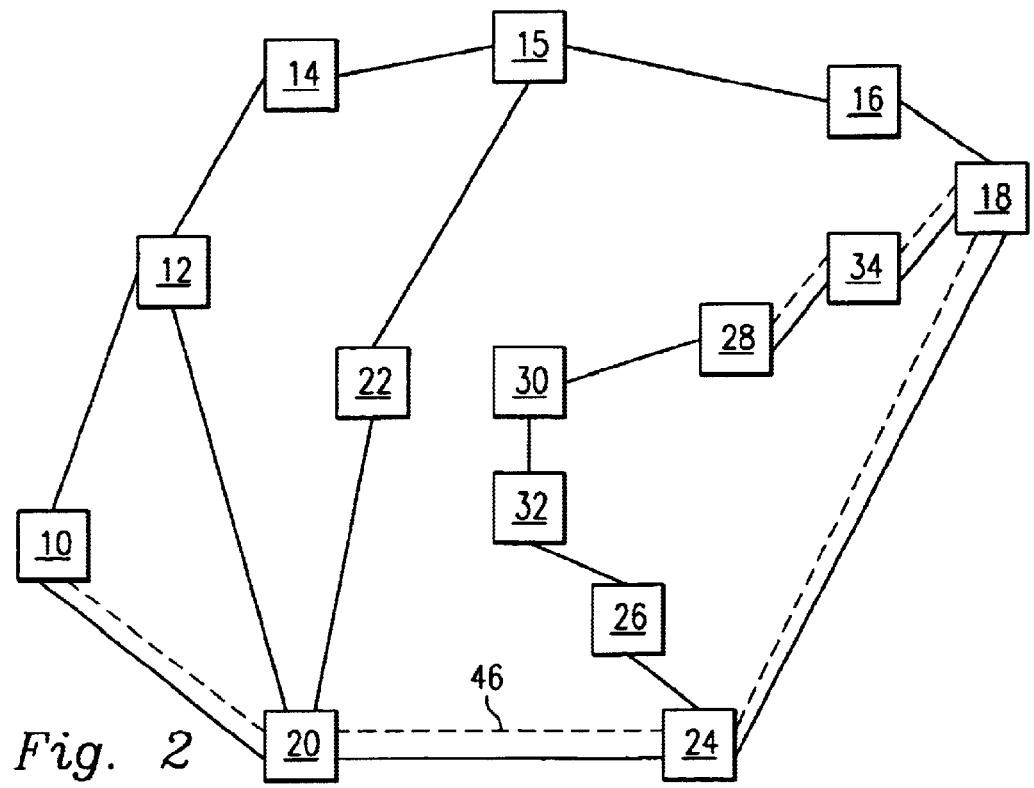
FIG. 2 is a diagram of one routing embodiment of one of the trunks.

Now if the trunk from network element 10 to network element 28 is routed over the shortest route, which is path 46 shown in FIG. 2, then the trunk from network element 10 to 28 cannot be routed using the shortest route without over utilizing at least one link in the network.

Figure 3:
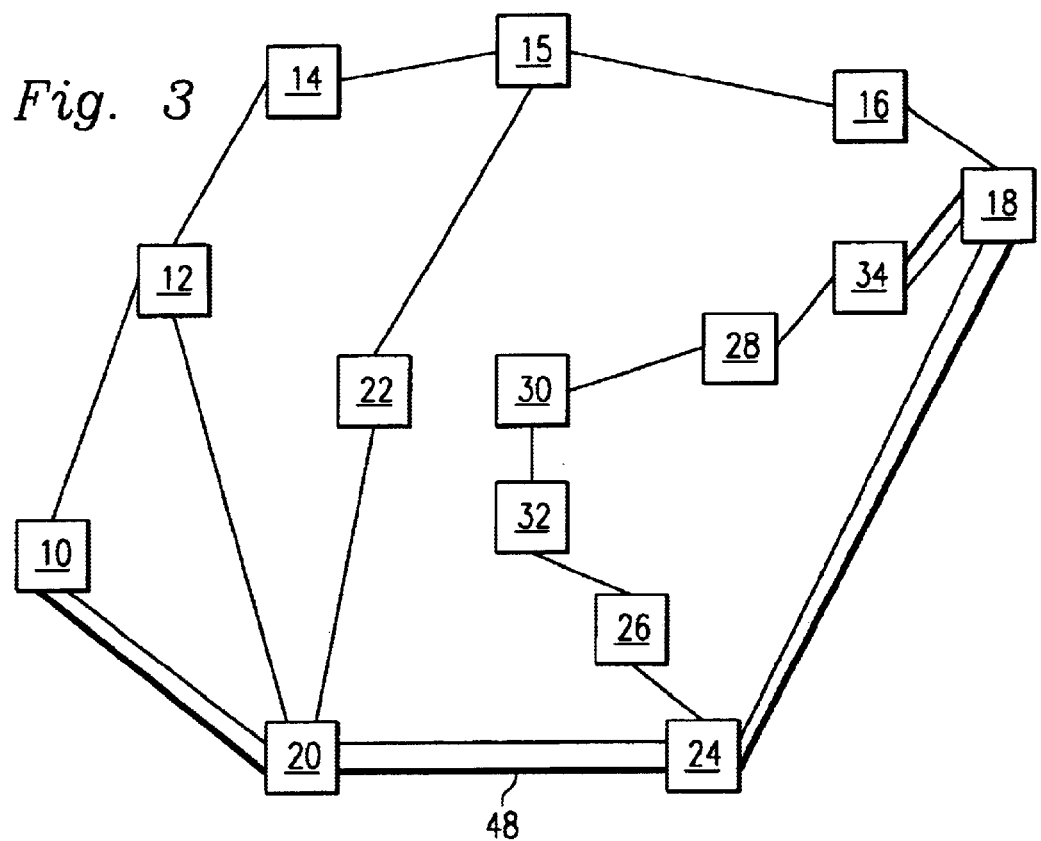
FIG. 3 is a diagram of one routing embodiment of the other trunk.

Similarly, if network element 1 to 34 is routed over the shortest route, path 48 as shown in FIG. 3, then 1 to 28 cannot be routed without over-utilization of links in the network.

Figure 4:
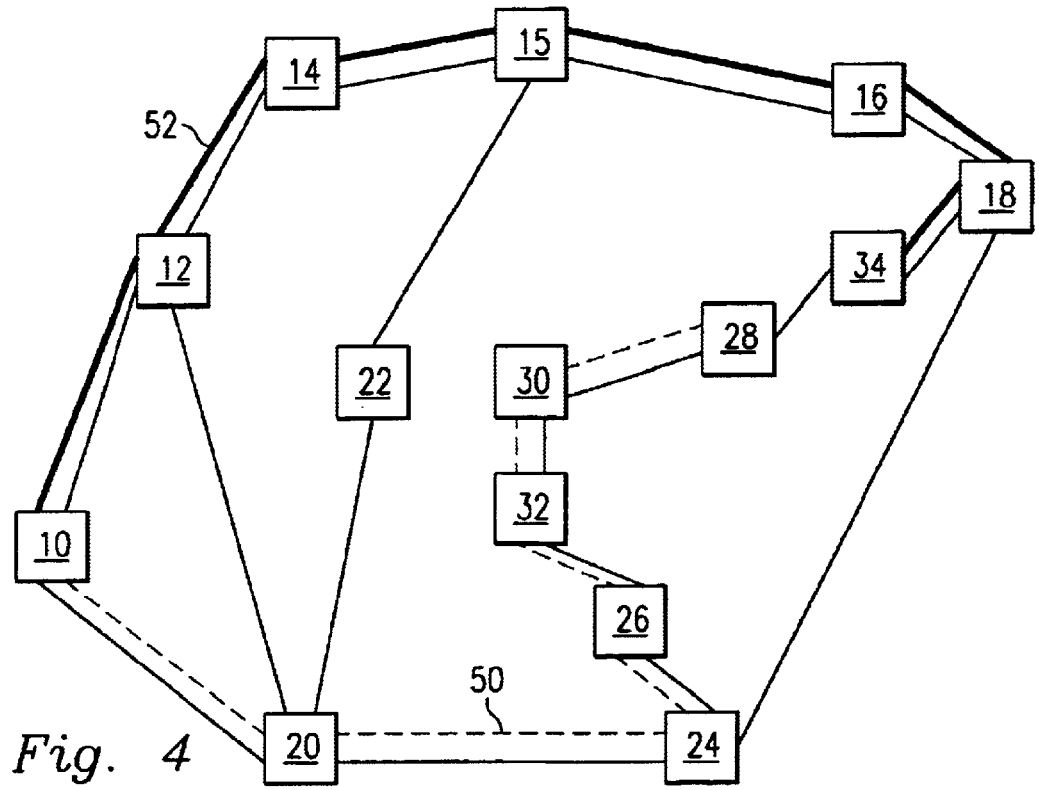
FIG. 4 is a diagram of the preferred routing of bot trunks of the examples.

FIG. 4 shows the optimal routing solution where both the trunks can be routed without over utilizing any links. In the optimal solution 1 to 28 is routed on path 50 and 1 to 34 is routed on path 52. This example illustrates the combinatorial nature of routing in a resource constraint network.

The invention uses concepts from network flow programming. Specifically, the invention uses a unique modification of a well-known mathematical model called multi-commodity flow model that occurs in network flow programming. The concepts of network flow programming including multi-commodity flow model have been explained in R. Ahuja, T. L. Magnanti, and J. B. Orlin. "*Network Flows: Theory, Algorithm and Applications*", Prentice Hall, 1993 and J. L. Kennington and R. V. Helgason 1980. "*Algorithms for Network Programming*", Wiley-Interscience, 1980. Multi-commodity model and general techniques to solve it are the exclusive topic of A. A. Assad, 1978, "*Multi-commodity network flows: A survey*", Networks 8, 37–91.

The standard multi-commodity model would correctly describe the trunk routing problem in a communications network model if all trunks would consume equal amount of resources. However, in a realistic network, all trunks do not consume an equal amount of resources. For example, a T3 trunk requires 28 times the capacity of; T1 trunk. Similarly, an OC12 trunk requires bandwidth capacity equivalent to 12 T3 trunks. The invention uniquely modifies the standard multi-commodity model to correctly depict realistic communication networks.

However, to describe the preferred embodiment, the well established multi-commodity model will be explained with the assumption that all trunks use equal amount of bandwidth. Then the simplifying assumption is lifted and the unique modification used by the invention is explained. The intention is not to explain or proof exhaustively the multi-commodity model as it has been in the literature, but just to use the proven concepts of multi-commodity model to illustrate and explain the model used in the invention.

Notation

If link i connect two nodes say node a and b, then i is said to be bi-directional if the traffic can flow from a to b or from b to a Generally, links in communications arm bi-directional and flows in network flow programming are directional. For bi-directional links, we associate variables x and z to represent flows in opposite direction.

L=A mapping of the set of all links in a network on a set of integers 1, . . . , I.

N=A mapping of the set of all nodes in a network on a set of integers 1, . . . , J.

T=A mapping of the set of all commodities to be routed on a set of integers 1, . . . , K.

A=Node arc incidence matrix.

$\bar{b}^k$=Vector of J elements associated to commodity k such that $i^{th}$ element $b_i^k$ is defined as $$b_{ik} = \begin{cases} s & i \text{ is the ingress node for } k \text{ and } s \text{ is the number of trunks incident upon } i. \\ -t & i \text{ is an egress node for } k \text{ and } s \text{ is the number of trunks incident upon } i. \\ 0 & i \text{ is neither an ingress nor egress.} \end{cases}$$

$\bar{x}_k$=A I×1 vector of link flows for commodity k. The $i^{th}$ element $x_{i,k}$ is flow on link i in one direction.

$\bar{z}_k$=A I×1 vector of link flows for commodity k. The $i^{th}$ element $z_{i,k}$ is flow on link t in the direction opposite to $x_{i,k}$.

$\bar{c}_k$=Cost vector for commodity k. The $i^{th}$ vector $c_{i,k}$ is the cost for a unit of flow of commodity k on link i.

$y_i$=Capacity of link i in terms of total number of traffic trunks that can routed over the link.

Multi-Commodity Model

The problem of routing can be described as a system of linear relationships as follows Minimize Cost:

$$\sum_{k=1}^{K} \bar{c}_k(\bar{x}_k + \bar{z}_k)$$

Such that following constraints are not violated $$A\bar{x}_k - A\bar{z}_k = \bar{b}_k \text{ for all } k \in T \ldots \quad (1)$$

$$\sum_{k=1}^{K}(x_{i,k} + z_{i,k}) \leq y_i$$

for all $i \in L \ldots$ (2)

$x_{i,k}, z_{i,k}$ are non-negative integers.

Here (1) are called as mass balance constraints and (2) are known as linking capacity constraints. [1], [2], and [3] give an excellent in-depth explanation of the multi-commodity model.

Modification of Multi-Commodity Model

As noted earlier, the assumption that all links and commodities use the same unit of bandwidth is too restrictive. For example, a network may have links that have bandwidth available in units of DS1 while others may have bandwidth available only in DS3; yet others may have speeds in units of OC12 and so on. Similarly, some traffic trunks may be DS1 or DS3 or OC12 etc. A key constraint is that a traffic trunk can only be routed over links with speed greater than the speed of the traffic trunk. For example, a DS3 trunk can only be routed over links that have speeds equivalent to DS3 or higher.

To remove the simplifying assumption of multi-commodity model that all commodities require same amount of bandwidth. We refine the definition of commodity. By this definition, a commodity is not only defined by the ingress node, but also the bandwidth required by the trunks in the commodity. We further define $\Delta$=Set of bandwidths of all commodities $\mu$=Minimum element of $\Delta$ $\kappa_k$=Bandwidth of commodity k.

$\beta_i$=Bandwidth of link i

To prevent routing a traffic trunk on links that have smaller bandwidth, we can remove such links from the node-arc incidence matrix and commodity flow vectors. However, for the sake of simplicity of the symbolic representation we define $\bar{x}'_k$=A I×1 vector of link flows for commodity k. Where, the $i^{th}$ element $x'_{i,k}$ is fixed at 0 if $\beta_i < \kappa_k$.

Similarly, $\bar{z}'_k$=A I×1 vector of link flows for commodity k. Where, the $i^{th}$ element $z'_{i,k}$ is fixed at 0 if $\beta_i < \kappa_k$.

Then the problem of routing can be formulated as follows

Minimize Cost:

$$\sum_{k=1}^{K} \bar{c}_k(\bar{x}'_k + \bar{z}'_k)$$

Such that following constraints are not violated $$A\bar{x}'_k - A\bar{z}'_k = \bar{b}_k \text{ for all } k \in T \ldots \quad (3)$$

$$\sum_{k=1}^{K} \Psi_k(x'_{i,k} + z'_{i,k}) \leq \Gamma_i y_i$$

for all $i \in L \ldots$ (4)

where $$\Psi_k = \left\lceil \frac{\kappa_k}{\mu} \right\rceil \text{ and } \Gamma_i = \left\lfloor \frac{\beta_i}{\mu} \right\rfloor$$

$\lfloor m \rfloor$ is defined as the greatest integer less than the real number m and $\lceil m \rceil$ is the least integer greater than m.

By fixing appropriate elements in x and z the invention prevents routing commodity k on links that are not eligible for commodity k. By introducing the coefficients $\Psi_k$ and $\Gamma_i$, in (4), the invention normalizes the resource requirements per unit of flow of traffic trunks and link bandwidth in terns of $\mu$. The flow coefficients $\Psi_k$ work like multipliers that translate a unit of flow of commodity k, with bandwidth $\kappa_k$, into a unit of flow of multiple of bandwidth $\mu$. Similarly, $\Gamma_i$ tabulates the bandwidth of link i into a multiple of bandwidths $\mu$.

If L is a set of links in the network, N is the set of nodes in the network and T is the set of commodities where each commodity includes all the traffic trunks with a particular ingress node. As a first step to map the problem on the mathematical model, a directed graph is generated from the set of nodes and links in the given communications network. Generally, links in a communications network are bi-directional (traffic can move in either direction) therefore two directional arcs, one in each direction, are used to represent a bi-directional link.

Routing Solution Process

The process by which the invention generates optimal routing solution will now be described. The mathematical model that is to be solved is an integer program, which is a NP-complete. Therefore, any algorithm that solves such a problem may search for the optimal solution for an indefinite amount of time. The invention provides an algorithm that quickly finds a solution, then iteratively improves the solution. The algorithm can be stopped at any time to retrieve the best solution found thus far.

Figure 5:
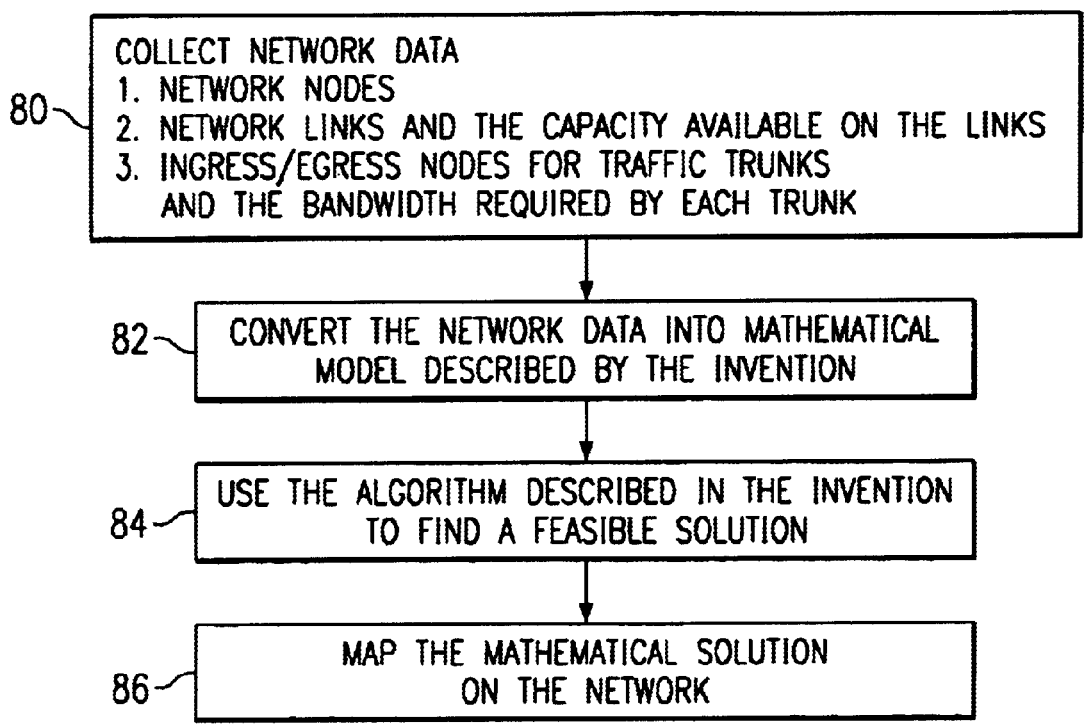
FIG. 5 is a flowchart of the system.

As shown in FIG. 5 show, the input required to solve optimal routing problem can he classified into 3 sets as shown in step 80: 1.) a set of nodes in the network and the bandwidth capacity of each node; 2.) a set of links in the network and the bandwidth capacity of each link; and 3.) a set of traffic trunks along with the bandwidth required. This information is used to construct the mathematical model as described previously. To quickly find a good routing solution, the invention uses the following algorithm. The invention uses a network simplex algorithm to solve for each commodity one at a time. The resources used by a commodity n are removed before routing the trunk in commodity (n+1) as shown in step 82. After all the commodities have been solved the total solution is compared to the best solution found so far. If the new solution is the better than the previous best solution, then the new solution replaces the best solution as shown in step 84. If the stopping criteria has been reached, then stop and present the best solution found thus far as shown in step 86. If the stopping criteria has not been reached then go to step 80. The stopping criteria could be any predefined condition e.g. best of a given number of solutions.

The algorithm used in the preferred embodiment to solve the mathematical model above is now described below in pseudocode and shown in FIG. 6.

We begin by:

1. Create a directed graph of the communications network such that

A graph vertex represents a network node.

For each directional link a directional arc is created.

For each bi-directional link a two arcs in opposite directions are created.
2. Set best_flow=0
3. Create a list of commodities comm_list from the list of traffic trunks. Each element of common_list is created as follows
   Set ingress and egress to demand and supply vertices in the directed graph
   Set the flow units of the demand-supply pair=number of trunks between the ingress-egress pair.
   Set demand-supply pair bandwidth=ingress-egress pair bandwidth
4. Set K=number of commodities.
5. Set best_cost=(sum of the cost of all links)×(sum of the flow units for all demands).
6. While (stopping_criteria is not reached)
7. total_feasible_flow=0; total_cost=0;
8. For j=1 to K
9. k=comm_list[j]
10. Set $\mu$=bandwidth of k.
11. For all l∈L=Set of links
    =Total bandwidth of l
    $\lambda$=Load on link l
    $c=\lfloor(-\lambda)/\mu\rfloor$
    Set the capacity of each arc representing l equal to c.
12. Use network simplex algorithm to determine the maximum feasible_flow and flow_cost for the commodity.
13. For all l∈L
    f=Total flow on the arcs representing l
    $\lambda$=Load on link l
    Load on l=($\mu$f+$\lambda$)
14. total_feasible_flow=total_feasible_flow+feasible flow
15. total_cost=total_cost+flow_cost
16. if ((total_feasible_flow<best_flow) OR
    ((total_cost<best_cost) AND (total_flow=best_flow)))
    Save the paths for all the commodities
17. Randomly change the order of elements in comm_list FIG. 6 illustrates a flow chart of the process. In the initialization step 90, a directed graph of the communications network is created. Additionally, a list of commodities is created from the list of traffic trunks. For each commodity, the ingress and egress nodes are set to demand and supply nodes respectively. Further, the flow units of the demand-supply pair is set to the number of trunks between the ingress-egress pair. The commodity ID is then set to 1.

In step 92, if the commodity ID is less than or equal to the total number of commodities, the process proceeds to step 96, otherwise, the process ends at step 94. In step 96, the arc capacity is set by first setting the u variable to the bandwidth of the traffic pair identified by the commodity ID. Additionally, for each link, the variable b is set to the total bandwidth of the link; the variable y is set to the load on the link; and the c variable is set to b-y divided by u and then rounded down to the nearest integer. The arc capacity is then set to c.

In step 98, a network simplex algorithm is used to solve the maximum flow problem for the commodity.

Step 100 then updates the link load by setting the u variable to the bandwidth of the traffic pair. Moreover, for each link, the f variable is set to the total flow on the arcs representing the link, while the y variable is set to the load on the link. Additionally, the load on the link is set to u times f plus y.

The routes taken by the commodity are then mapped in the digraph on the traffic trunk over the communications network in step 102. The commodity ID is then incremented in step 104 and the process starts back over in step 92.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of allocating network resources, method comprising:
   creating a model of a plurality of network nodes, a plurality of network links, and a plurality of traffic trunks;
   determining available arc capacity for a commodity of a plurality of commodities by subtracting from the total bandwidth of the arc the bandwidth already in use by other commodities and then dividing the difference by a bandwidth of the commodity and rounding it down to the largest integer that is smaller than the ratio of the available arc capacity;
   determining a maximum flow of the commodity;
   updating a link load; and
   mapping a solution on the network resources.

2. The method of claim 1, wherein the model includes mapping of traffic trunks to supply and demand nodes by:
   setting a plurality of ingress trunk nodes to a plurality of demand nodes;
   setting a plurality of flow units of a demand and supply pair to a number of trunks between a corresponding ingress and egress pair.

3. The method of claim 2, wherein supply and demand node pairs are classified to be in a single commodity if they all have the same supply node and same bandwidth per unit of required flow.

4. The method of claim 2, wherein supply and demand node pairs can be classified into a single commodity if they have the same demand node and same bandwidth per unit of required flow.

5. The method in claim 1, where in the updating the link load includes adding the bandwidth used by each commodity routed over that link.

6. A computer software system of allocating network resources, the system comprising:
   computer instructions to create a model of a plurality of network nodes, a plurality of network links, and a plurality of trunks;
   computer instructions to determine available arc capacity for a commodity of a plurality of commodities by subtracting from the total bandwidth of the arc the bandwidth already in use by other commodities and then dividing the difference by a bandwidth of the commodity and rounding it down to the largest integer that is smaller than the ratio of the available arc capacity;
   computer instructions to determine a maximum flow of the commodity;
   computer instructions to update a link load; and
   computer instructions to map a solution on the network resources.

7. The system of claim 6, wherein the computer instructions to create the model includes:
   computer instructions to set a plurality of ingress trunk nodes to a plurality of demand nodes;

computer instructions to set a plurality of egress nodes to a plurality supply nodes; and computer instructions to set a plurality of flow units of a demand and supply pair to a number of trunks between a corresponding ingress and egress pair.

8. The system of claim 7, further including computer instructions to classify supply and demand node pairs to a single commodity if they all have the same supply node and same bandwidth per unit of required flow.

9. The system of claim 7, further including computer instructions to classify supply and demand node pairs into a single commodity if they have the same demand node and same bandwidth per unit of required flow.

10. The system of claim 6, wherein the computer instructions to update the link load includes computer instructions to add the bandwidth used by each commodity routed over the link.

11. A method of allocating network resources, method comprising:

creating a model of a plurality of network nodes, a plurality of network links, and a plurality of trunks, wherein creating the model includes:

setting a plurality of ingress nodes to a plurality of demand nodes;

setting a plurality of egress nodes to a plurality of supply nodes; and setting a plurality of flow units of a demand and supply pair to a number of trunks between a corresponding ingress and egress pair;

determining an arc capacity for each commodity of a plurality of commodities;

determining a maximum flow of the commodity;

updating a link load; and mapping a solution on the network resources.

12. The method of claim 9, wherein at least two egress nodes are set to one ingress node.

13. The method of claim 9, wherein the determining the arc capacity is done by subtracting bandwidth of the link and dividing by a bandwidth of the commodity and rounding down to the closest integer.

14. The method in claim 9, wherein the updating the link load includes setting the link load to the total flow on the link multiplied by the bandwidth and adding an existing load on the link.

* * * * *